(12) United States Patent
Tsuji

(10) Patent No.: US 8,356,129 B2
(45) Date of Patent: Jan. 15, 2013

(54) REQUEST ARBITRATION APPARATUS AND REQUEST ARBITRATION METHOD

(75) Inventor: Ryuichi Tsuji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 695 days.

(21) Appl. No.: 12/548,384

(22) Filed: Aug. 26, 2009

(65) Prior Publication Data

US 2010/0057963 A1 Mar. 4, 2010

(30) Foreign Application Priority Data

Aug. 27, 2008 (JP) ................................. 2008-217740

(51) Int. Cl.
*G06F 12/00* (2006.01)
(52) U.S. Cl. ........................... 710/244; 710/310; 710/41
(58) Field of Classification Search .......... 710/240–244, 710/309, 310, 123, 41, 51
See application file for complete search history.

(56) References Cited

U.S. PATENT DOCUMENTS

| | | | | |
|---|---|---|---|---|
| 5,276,902 A | * | 1/1994 | Nakatani et al. .................. | 712/6 |
| 5,367,654 A | * | 11/1994 | Furukawa et al. ............ | 711/158 |
| 5,408,627 A | * | 4/1995 | Stirk et al. ..................... | 711/151 |
| 5,857,110 A | * | 1/1999 | Sakakibara et al. ............... | 712/2 |
| 6,629,220 B1 | * | 9/2003 | Dyer .............................. | 711/158 |
| 6,915,367 B2 | * | 7/2005 | Gary et al. ..................... | 710/244 |
| 7,574,573 B2 | * | 8/2009 | Shrader et al. ................ | 711/158 |
| 2004/0236889 A1 | * | 11/2004 | Kim ............................. | 710/113 |
| 2010/0153661 A1 | * | 6/2010 | Vamanan et al. ............. | 711/154 |

FOREIGN PATENT DOCUMENTS

JP   2004-288021 A   10/2004

* cited by examiner

*Primary Examiner* — Khanh Dang
(74) *Attorney, Agent, or Firm* — Kilpatrick Townsend & Stockton LLP

(57) ABSTRACT

There is provided a request arbitration apparatus for arbitrating a plurality of request holding sections which hold requests having priorities when the requests are output from the plurality of request holding sections to the output device. The request arbitration apparatus includes: a setting section that sets the request holding section, which holds the highest priority request among all the requests held by the plurality of request holding sections, as a highest priority request holding section; and a control section that controls the highest priority request holding section so that the request held first among all the requests held by the highest priority request holding section is output to the output device.

4 Claims, 8 Drawing Sheets

REQUEST ARBITRATION APPARATUS AND REQUEST ARBITRATION METHOD

This application claims priority to Japanese Patent Application No. 2008-217740, filed Aug. 27, 2008, the entirety of which is incorporated by reference herein.

BACKGROUND

1. Technical Field

The present invention relates to a request arbitration apparatus and a request arbitration method.

2. Related Art

When a plurality of devices such as processors accesses a memory, requests for accessing the memory are output from the plurality of devices. Hence, generally, a technique is known which uses an arbitration circuit (an arbiter) for arbitrating the plurality of requests (for example, refer to FIG. 13 in JP-A-2004-288021). By using an arbiter, it is possible to efficiently access the memory, for example, in a way in which it is decided which request to service first on the basis of the priority of each of the requests even when the plurality of requests are output from a device at approximately the same time.

On the other hand, as a memory capable of efficiently performing access, a multi-bank memory formed of a plurality of banks is known. When the arbitration is performed on the requests for the multi-bank memory, as shown in FIG. 8, the following method can be considered: first, the requests are divided into the banks of an accessed memory 220 and are held in buffers 201 to 204 corresponding to the divided banks, and then an arbiter 210 determines the buffer to output the request held therein to the memory 220, thereby arbitrating the accesses to the memory. In this case, the order of a reading request and a recording request issued to the same address of the same bank may be changed. This causes false reading of data. Hence, it is necessary for the buffers 201 to 204 to hold the request in FIFO (First In First Out). In such a configuration, as shown in FIG. 8, the buffer 201 may hold a request q having a high priority subsequent to a request p having a low priority. In this case, the priority of requests r to t, which are held by the buffers 202 to 204, is medium. Hence, the arbiter 210 outputs the requests r to t to the memory 220, then outputs the request p to the memory 220, and subsequently outputs the request q to the memory 220. Accordingly, even though the request q has a higher priority than the requests r to t, the output of the request q to the memory 220 is delayed. Further, as long as the request, of which the priority is medium, is newly held and remains in the buffers 202 to 204, the request q, of which the priority is high, is not output to the memory 220.

SUMMARY

An advantage of some aspects of the invention is to output the highest priority request as fast as possible when the plurality of request holding sections holds requests having priorities.

In order to achieve the above mentioned advantage of some aspects of the invention, the following configurations are adopted.

According to an aspect of the invention, there is provided the request arbitration apparatus for arbitrating a plurality of request holding sections which hold requests having priorities when the requests are output from the plurality of request holding sections to the output device. The request arbitration apparatus includes: a setting section that sets the request holding section, which holds the highest priority request among all the requests held by the plurality of request holding sections, as a highest priority request holding section; and a control section that controls the highest priority request holding section so that the request firstly held among all the requests held by the highest priority request holding section is output to the output device.

In the request arbitration apparatus according to this aspect of the invention, the request holding section, which holds the highest priority request among all the requests held by the plurality of request holding sections, is set as the highest priority request holding section when the requests are output from the plurality of request holding sections, which hold requests having priorities, to the output device. Then, the highest priority request holding section is controlled so that the request held first among all the requests held by the highest priority request holding section is output to the output device. As described above, since the requests are output preferentially from the request holding section which holds the highest priority request, it is possible to output the highest priority request as fast as possible.

In the request arbitration apparatus according to this aspect of the invention, it is preferred that the apparatus further include a priority change section that makes the priorities of the requests, which are lower than those of new requests among the requests already held by the request holding sections, be equivalent to those of the new requests whenever the plurality of request holding sections hold the new requests. In addition, it is also preferred that the setting section set the request holding section, which holds the highest priority requests among the requests firstly held by the plurality of request holding sections, as the highest priority request holding section. In such a manner, it is possible to set the highest priority request holding section in a shorter period of time compared with the case where the priorities of all the requests held by the request holding sections are compared with each other.

In the request arbitration apparatus according to this aspect of the invention, it is preferred that the apparatus further include a plurality of the highest priority holding sections that respectively correspond to the plurality of request holding sections and retain the highest priority among the priorities of the requests which are held by the request holding sections corresponding thereto. In addition, it is also preferred that the setting section set the request holding section, which corresponds to the highest priority holding section retaining the highest priority among the plurality of highest priority holding sections, as the highest priority request holding section. In such a manner, it is possible to set the highest priority request holding section in a shorter period of time compared with the case where the priorities of all the requests held by the request holding sections are compared with each other.

In the request arbitration apparatus according to this aspect of the invention, it is preferred that the output device be a memory having a plurality of banks. In addition, it is also preferred that the request holding sections be sections corresponding to the respective banks of the memory and holding the requests as data input/output requests to the corresponding banks. When the requests as the data input/output requests to the memory, which has the plurality of banks, are issued, the plurality of request holding sections is able to hold the requests in order to efficiently arbitrate the requests. Accordingly, in this point of view, the application of the invention is of great significance.

According to another aspect of the invention, there is provided a request arbitration method for arbitrating a plurality of request holding sections which hold requests having priorities when the requests are output from the plurality of request holding sections to the output device. The request arbitration method includes: (a) setting the request holding section, which holds the highest priority request among all the requests held by the plurality of request holding sections, as the highest priority request holding section; and (b) controlling the highest priority request holding section so that the request held first among all the requests held by the highest priority request holding section is output to the output device.

In the request arbitration method according to another aspect of the invention, the requests are output preferentially from the request holding section which holds the highest priority request, similarly to the above-mentioned request arbitration apparatus. Hence, it is possible to output the highest priority request as fast as possible. Furthermore, in the request arbitration method, it may be possible to add steps for executing the above-mentioned several functions of the request arbitration apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

First Embodiment

Figure 1:
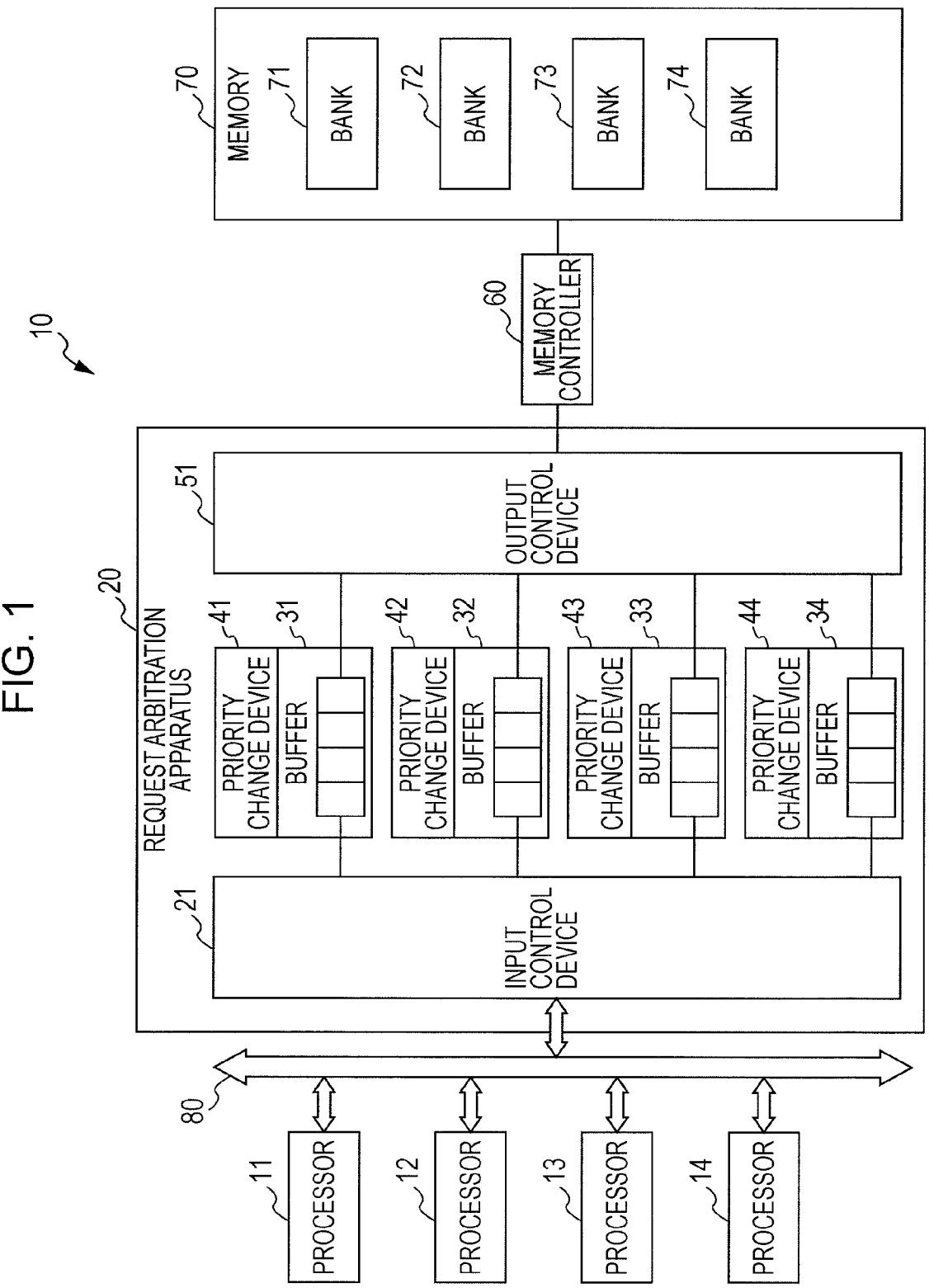
FIG. 1 is a configuration diagram illustrating a schematic configuration of a processor system according to a first embodiment.

First, a first embodiment will be described. FIG. 1 is a configuration diagram illustrating a schematic configuration of a processor system 10 according to the first embodiment.

In the processor system 10, processors 11 to 14 are connected to a request arbitration apparatus 20 through a bus 80 as shown in FIG. 1. Further, the request arbitration apparatus 20 is connected to a memory 70 through a memory controller 60.

The processors 11 to 14 are processors that share a printing process of image data stored in the memory 70 and perform the shared processes in accordance with a program read from a ROM which is not shown. Specifically, the processor 11 performs a process that reads RGB image data stored in the memory 70, converts the data into CMYK image data, and stores the data in the memory 70; the processor 12 performs a process that reads the CMYK image data from the memory 70, converts the data into binarized data in which each of the CMYK colors is represented by 2 bits, and stores the data in the memory 70; the processor 13 extracts binarized data corresponding to one scanning of a head from the binarized data stored in the memory 70 and stores the data in the memory 70 as image data; and the processor 14 performs a process that reads the image data from the memory 70 and controls a printing apparatus, which is not shown, to print an image based on the image data. The processors 11 to 14 output the requests as data input/output requests to the memory 70 through the request arbitration apparatus 20 and the memory controller 60. The requests include control information for specifying either reading or recording of data, and address information for specifying addresses of memory 70 at which the reading or recording of data is performed. The requests also include data for the recording in the case of the requests for the recording. Further, since the requests have predetermined priorities for each processor, in this example, the processors 11 to 14 respectively output the requests having priorities "1" to "4". Furthermore, it is assumed that priority becomes higher as the value of the priority decreases.

The request arbitration apparatus 20 is an apparatus for arbitrating the requests on the basis of the priorities of the requests which are output by the processors 11 to 14. The apparatus includes: an input control device 21 for holding the request, which is input from the processors 11 to 14, in any one of buffers 31 to 34; the buffers 31 to 34 for holding the input requests in a first-input first-output (FIFO) mode; priority change devices 41 to 44 for performing a priority change process to be described later whenever the buffers 31 to 34 hold new requests; and an output control device 51 for outputting the request, which is held by any one of the buffers 31 to 34, to the memory controller 60 on the basis of the priority of the request.

The input control device 21 determines which of the banks 71 to 74 in the memory 70 the request is headed for on the basis of the address information of the input request, and performs a request input process for outputting the request to any one of the buffers 31 to 34 corresponding to the determined bank.

The buffers 31 to 34 respectively correspond to the banks 71 to 74. In addition, when the requests output from the input control device 21 are input, the buffers 31 to 34 hold the requests in the FIFO mode. Further, in the embodiment, each of the buffers 31 to 34 is able to hold a maximum of four requests, but the maximum number of requests may be changed if only the maximum number thereof is not less than 2.

The priority change devices 41 to 44 respectively correspond to the buffers 31 to 34. Each of the priority change devices 41 to 44 is a processor that performs a priority change process for making the priorities of the requests, which are lower than those of the requests newly held among the requests already held by the request holding sections, be equivalent to those of the requests newly held whenever the corresponding buffers newly hold the requests. The priority change process will be described in detail later.

The output control device 51 sets the buffer, which is holding the request having the highest priority, as the highest priority buffer by comparing the priorities of the requests which are held first by the buffers 31 to 34. Then, the output control device 51 performs a request output process for outputting the request, which is held first by the buffer set as the highest priority buffer, to the memory controller 60. Furthermore, in the embodiment, when the number of the buffers, which are holding the highest priority requests, is plural, the highest priority buffer is set using a round-robin method, but may be set using a different method. Further, the output control device 51 inputs information as to whether or not the memory controller 60 is able to receive the new request through a signal line which is not shown, and performs the request output process only when the memory controller 60 is able to receive.

The memory controller 60 is a device for recording or reading data into or from the memory 70. The memory controller 60 controls the memory 70 to perform data input/output operation on the basis of data, control information, and address information of the request by inputting the request output from the output control device 51. Further, as described above, the memory controller 60 outputs information as to whether or not it is able to receive the new request through a signal line which is not shown to the output control device 51. Furthermore, the memory controller 60 is unable to receive the new request when performing a process relating to the previous request, for example, when controlling the memory 70 to perform a data input/output operation.

The memory 70 is a multi-bank memory formed of the four banks 71 to 74. In the memory 70, data input/output operation based on the request is performed by the memory controller 60.

Next, operations of the processor system 10, which is configured as described above, according to the first embodiment of the invention will be described. In particular, an operation of the request arbitration apparatus 20 at the time of arbitrating the requests output from the processors 11 to 14 will be described.

Figure 2:
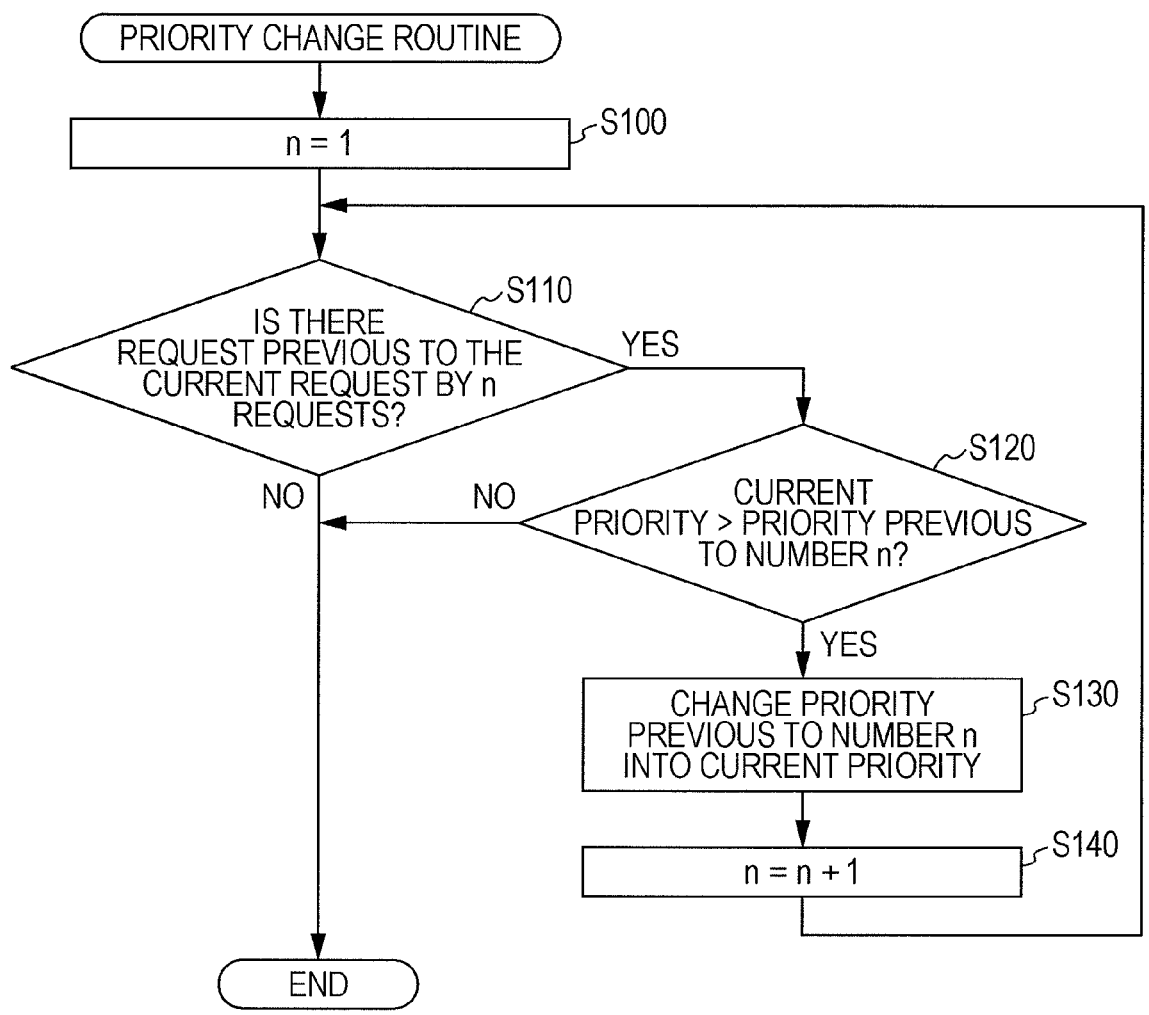
FIG. 2 is a flowchart illustrating an example of a priority change routine.

First, the priority change process performed by the priority change device 41 will be described. FIG. 2 is a flowchart illustrating an example of the priority change routine. The priority change routine is executed whenever the buffer 31 corresponding to the priority change device 41 newly holds the request. In the priority change routine, first, a value of counter n (n is an integer) is initialized to 1 (step S100). Then, it is determined whether or not a request previous to the current request by n requests held by the buffer 31 exists (step S110). Here, since the counter n is 1, the request previous to the current request by n requests is defined as a request previous to the current request by one request, that is, the last request held among the requests already held by the buffer 31 before the buffer 31 holds the new request. If it is determined that the request previous to the current request by n requests does not exist in step S110, the priority change routine is terminated. In contrast, if it is determined that the request previous to the current request by n requests exists in step S110, it is determined whether or not a priority of the request newly held by the buffer 31 is higher than the priority of the request previous to the current request by n requests held by the buffer 31 (step S120). That is, since the counter n is 1, it is determined whether or not the priority of the request newly held by the buffer 31 is higher than the request previous to the current request by one request held by the buffer 31. If it is determined that the priority of the request newly held by the buffer 31 is lower than the priority of the request previous to the current request by n requests held by the buffer 31 in step S120, the priority change routine is terminated. In contrast, if it is determined that the priority of the request newly held by the buffer 31 is higher than the priority of the request previous to the current request by n requests held by the buffer 31 in step S120, the priority of the request previous to the current request by n requests is changed into the priority of the request newly held (step S130). Then, the counter n is increased by 1 (step S140), and the flow proceeds to step S110. Specifically, when the counter n is the initial value of 1, the counter n is changed into 2 in step S140, and it is determined whether or not the request previous to the current request by two requests exists in step S110. Next, the above-mentioned processes from S110 to S140 are repeated until the determination in step S110 or step S120 is negative. Furthermore, the reason why the priority change routine is terminated if the determination in step S120 is negative is as follows: by performing the priority change routine, a priority of the request previous to the current request by n+1 requests is changed to be equal to or higher than the priority of the request previous to the current request by n requests; and even when the processes from step S110 to S140 are repeated and the determination in step S120 is performed on the further previous requests after the determination in step S120 is negative, there is no possibility that the determination is positive.

Figure 3A:
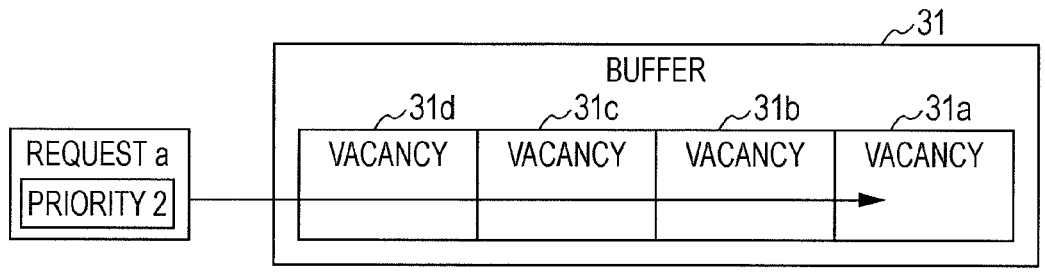
FIGS. 3A, 3B, 3C, and 3D are explanatory diagrams illustrating conditions of a priority change process.
Figure 3B:
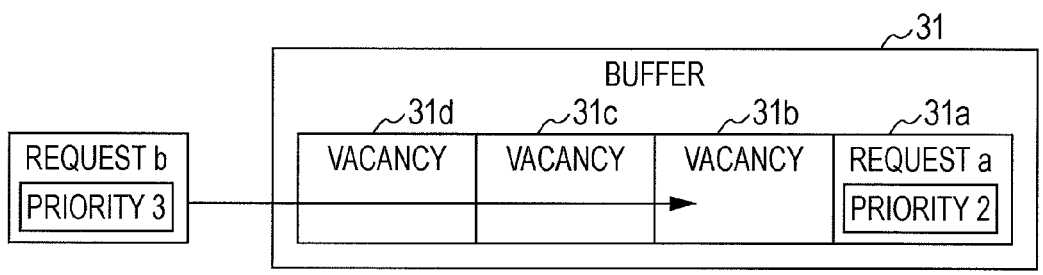
Figure 3C:
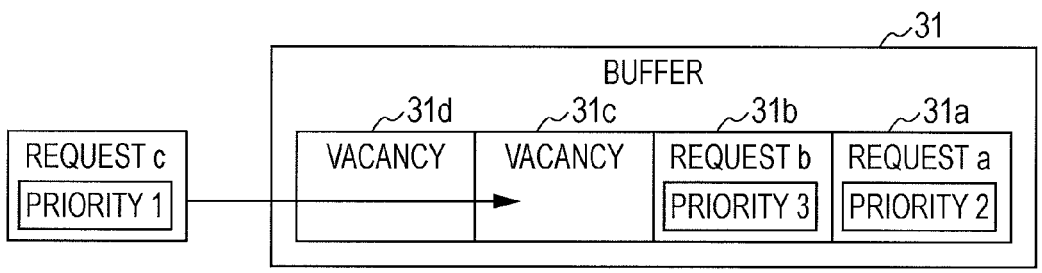
Figure 3D:
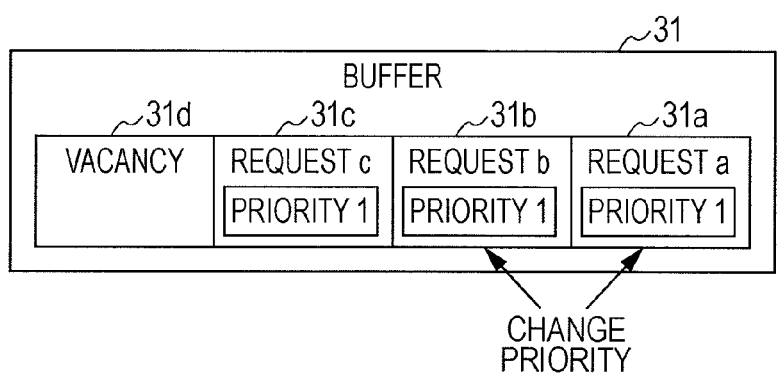

The conditions of the priority change process that changes the priorities of the requests held by the buffer 31 by using the above-mentioned priority change routine will be described with reference to FIGS. 3A, 3B, 3C, and 3D and FIGS. 4A and 4B. As shown in FIG. 3A, the request may be not held in any one of retention regions 31a to 31d of the buffer 31. In this case, when the request a having a priority "2" is input, the request a is held in the retention region 31a. At this time, the priority change device 41 performs the priority change routine. Then, since a request previous to the request a by one request does not exist, the determination in step S110 is negative. Accordingly, the priority change device 41 terminates the priority change routine. Next, as shown in FIG. 3B, when the request b having a priority "3" is input, the request b is held in the retention region 31b. At this time, the priority change device 41 performs the priority change routine. Then, since the priority of the request b newly held at the current time is lower than the priority of the request a which is the request previous to the current request by one request, the determination in step S120 is negative. Accordingly, the priority change device 41 terminates the priority change routine. Furthermore, as shown in FIG. 3C, when the request c having a priority "1" is input, the request c is held in the retention region 31c. At this time, the priority change device 41 performs the priority change routine. Then, since the priority of the request c newly held at the current time is higher than the priority of the request b which is the request previous to the current request by one request, the determination in step S120 is positive. Accordingly, the priority change device 41 changes the priority of the request b from "3" to "1" in step S130. In addition, since the request previous to the current request by two requests exists, the determination in step S110 is positive when the counter n is 2, and thus the flow proceeds to step S120. Then, since the priority of the request c newly held at the current time is higher than the priority of the request a which is the request previous to the current request by two requests, the determination in step S120 is positive. Accordingly, the priority change device 41 changes the priority of the request a from "2" to "1" in step S130. When the process in step S130 is performed, there is no request previous to the current request by three requests. Hence, the determination in step S110 is negative when the counter n is 3. Accordingly, the priority change device 41 terminates the priority change routine. In such a manner, as shown in FIG. 3D, the priorities of the requests a and b are changed into priority "1" which is equivalent to that of the request c.

Figure 4A:
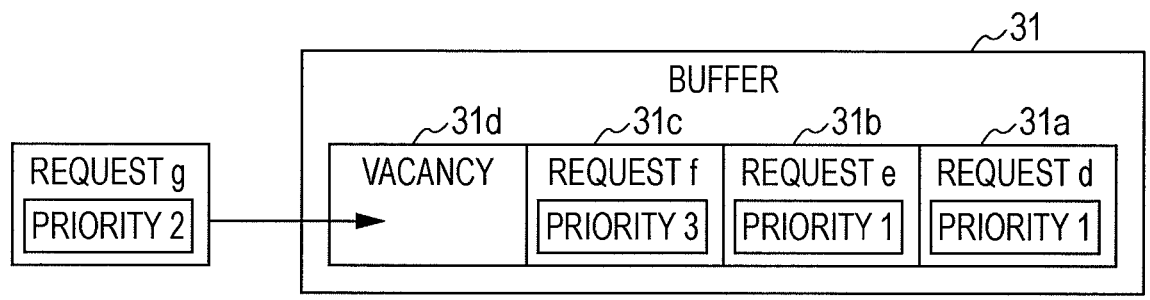
FIGS. 4A and 4B are explanatory diagrams illustrating conditions of a priority change process.
Figure 4B:
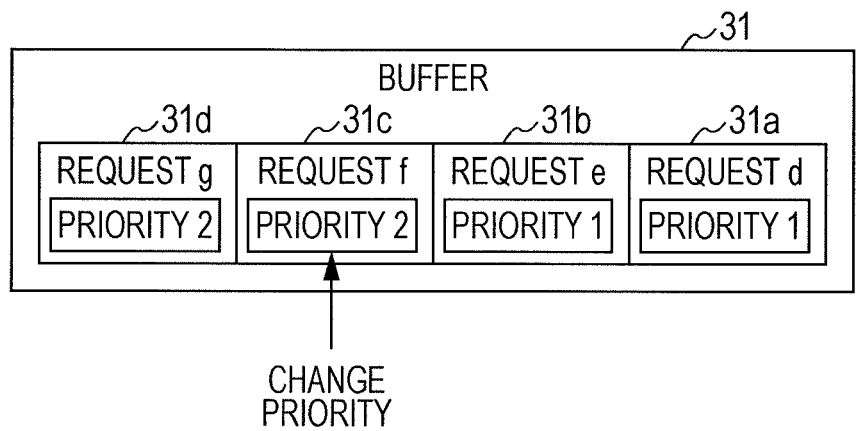

Further, as shown in FIG. 4A, the request d having a priority "1", the request e having a priority "1", and the request f having a priority "3" may be held in the retention region 31a to 31c of the buffer 31, respectively. In this case, when the request g having a priority "2" is input, the request g is held in the retention region 31d. At this time, the priority change device 41 performs the priority change routine. Then, since the priority of the request g newly held at the current time is higher than the priority of the request f which is the request previous to the current request by one request, the determination in step S120 is positive. Accordingly, the priority change device 41 changes the priority of the request f from "3" to "2" in step S130. In addition, since the request previous to the current request by two requests exists, the determination in step S110 is positive when the counter n is 2, and thus the flow proceeds to step S120. Then, since the priority of the request g newly held at the current time is lower than the priority of the request e which is the request previous to the current request by two requests, the determination in step S120 is negative. Accordingly, the priority change device 41 terminates the priority change routine. In such a manner, as shown in FIG. 4B, the priority of the request f is changed into the priority "2" which is equivalent to that of the request g.

As described above, the priority change device 41 performs the priority change routine shown in FIG. 2, thereby making the priorities of the requests, which are lower than those of the requests newly held among the requests already held by the buffer 31, be equivalent to those of the requests newly held. In such a manner, it is possible to make the priority of the request held first in the buffer 31, that is, the priority of the request held in the retention region 31a in FIGS. 3A, 3B, 3C, and 3D and FIGS. 4A and 4B be equivalent to that of the highest priority request among all the requests held by the buffer 31. Furthermore, description of the priority change devices 42 to 44 will be omitted since the priority change process is performed by the same priority change routine except that the buffers corresponding thereto are buffers 32 to 34.

Figure 5A:
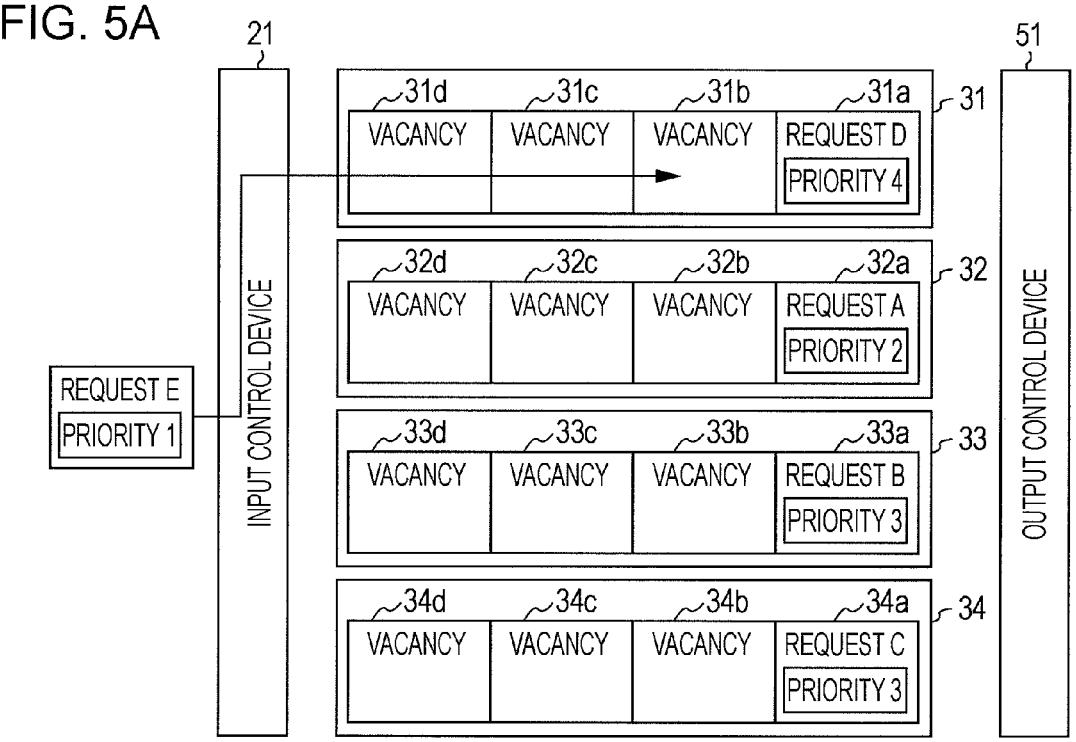
FIGS. 5A and 5B are explanatory diagrams illustrating conditions of operations of a request arbitration apparatus.

Subsequently, an operation of the request arbitration apparatus 20 will be described. FIG. 5A shows a state where the request A output from the processor 12 to the bank 72, the request B output from the processor 13 to the bank 73, the request C output from the processor 13 to the bank 74, the request D output from the processor 14 to the bank 71 are held by the buffers 31 to 34 of the request arbitration apparatus 20. As described above, when the request is output from the processors 11 to 14, the input control device 21 performs the request input process. That is, since the requests A, B, C, and D are requests to the respective banks 72, 73, 74, and 71, the input control device 21 outputs the requests A, B, C, and D to the corresponding buffers 32, 33, 34, and 31. Hence, as shown in FIG. 5A, the buffer 31 holds the request D in the retention region 31a, the buffer 32 holds the request A in the retention region 32a, the buffer 33 holds the request B in the retention region 33a, and the buffer 34 holds the request C in the retention region 34a. At this time, the priority setting sections 41 to 44 perform the above-mentioned priority change process, but there is no request already held in the buffers 31 to 34. Hence, the determination in step S110 of FIG. 2 is negative in all the buffers. Accordingly, the priority change process is terminated. Furthermore, in this state, when the memory controller 60 is able to receive a new request, the output control device 51 performs the above-mentioned request output process. Specifically, the output control device 51 sets the buffer 32 holding the request A, which is the highest priority request, as the highest priority buffer by comparing the priorities of the requests A to D held in the retention regions 31a, 32a, 33a, and 34a which retain the requests held first in the buffers 31 to 34, and outputs the request A, which is held in the retention region 32a of the buffer 32, to the memory controller 60. Then, the output control device 51 controls the memory controller 60 to input the request A and controls the memory 70 to perform the data input/output operation on the basis of the address information, the control information and the data of the request A.

Figure 5B:
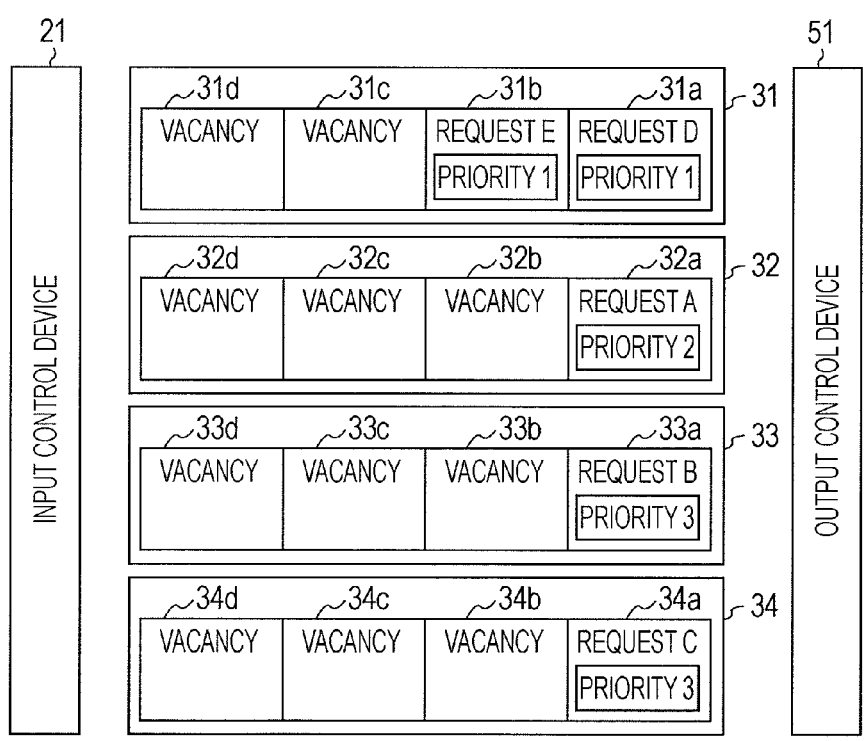

In contrast, when the memory controller 60 is unable to receive the new request and the input control device 21 newly inputs the request E, which is output from the processor 11, to the bank 71 as shown in FIG. 5A, the request E is held in the retention region 31b of the buffer 31. At this time, since the priority change device 41 performs the priority change process, the priority of the request D is changed from "4" to "1" as shown in FIG. 5B. Subsequently, when the memory controller 60 is able to receive the new request, the output control device 51 performs the above-mentioned request output process. Specifically, the output control device 51 sets the buffer 31 holding the request D, which is the highest priority request among the requests A to D held in the retention regions 31a, 32a, 33a, and 34a, as the highest priority buffer, and outputs the request D, which is held in the retention region 31a of the buffer 31, to the memory controller 60. Thereby, since the buffer 31 is an FIFO system, the request E is held in the retention region 31a. In this state, the output control device 51 performs the above-mentioned request output process. Then, the output control device 51 sets the buffer 31 holding the request E, which is the highest priority request among the requests E, A, B, and C held in the retention regions 31a, 32a, 33a, and 34a, as the highest priority buffer, and outputs the request E, which is held in the retention region 31a of the buffer 31, to the memory controller 60. In such a manner, the highest priority request E held later is output to the memory controller 60 earlier than the requests A to C.

Here, correspondence relation between the elements of the first embodiment and the elements of the aspects of the invention is as follows. In the first embodiment, the buffers 31 to 34 correspond to the request holding sections of the aspects of the invention, the output control device 51 corresponds to the setting section and the control section, the priority change devices 41 to 44 correspond to the priority change sections, and the memory 70 corresponds to the output device. Furthermore, the first embodiment showed the operations of the processor system 10 as an example of the request arbitration method according to the aspect of the invention.

In the first embodiment mentioned above, even when the highest priority request is input later, the request is output from the buffer which has held the request. Accordingly, it is possible to output the highest priority request as fast as possible. Further, the priority change devices 41 to 44 perform the priority change processes, and the output control device 51 sets the buffer, which is holding the highest priority request among the requests held first by the buffers 31 to 34, as the highest priority buffer. Accordingly, it is possible to set the highest priority buffer in a shorter period of time compared with the case where the highest priority buffer is set by comparing the priorities of all the requests which are held by the buffers 31 to 34.

Second Embodiment

Figure 6:
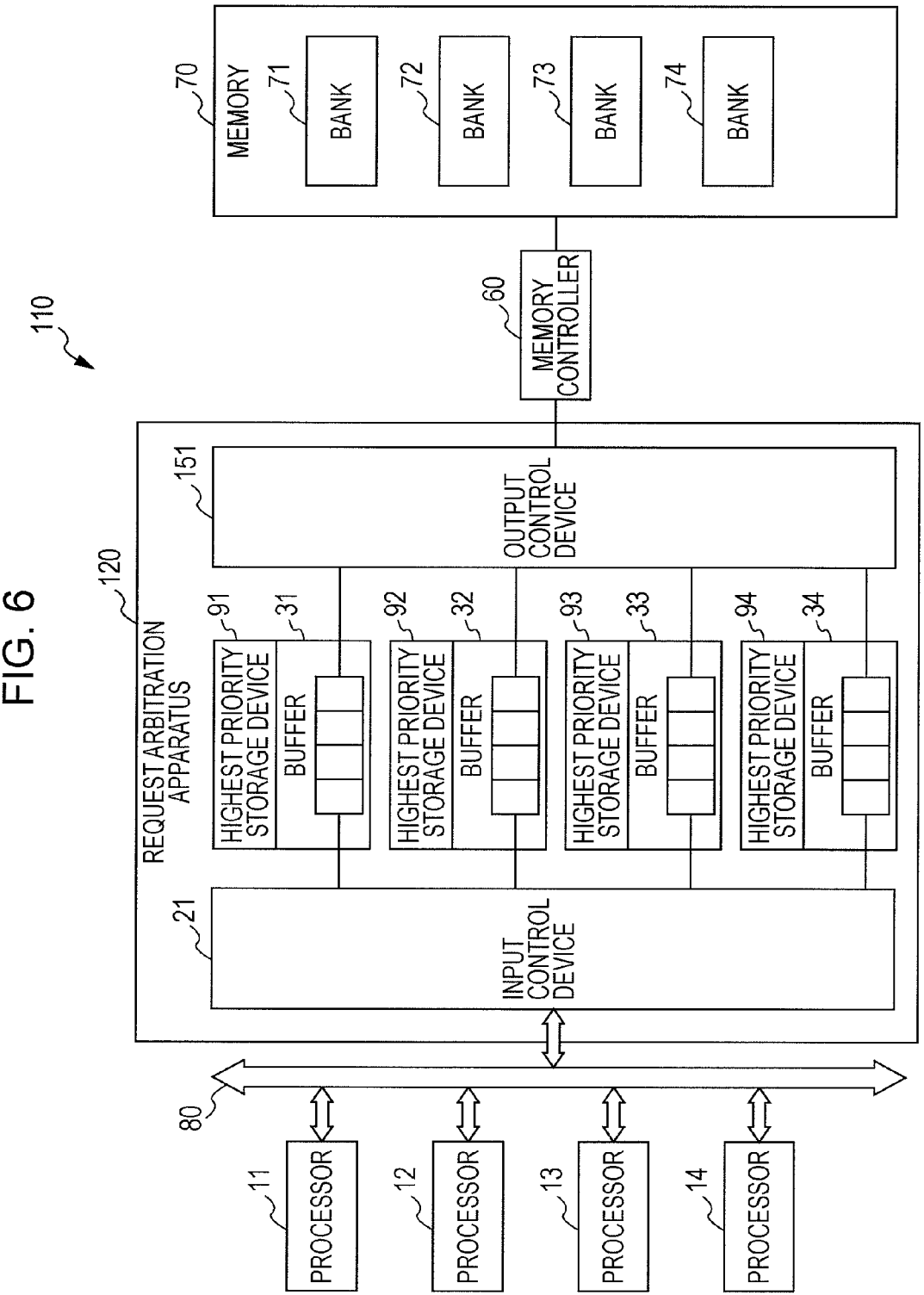
FIG. 6 is a configuration diagram illustrating a schematic configuration of a processor system according to a second embodiment.

Next, a second embodiment will be described. FIG. 6 is a configuration diagram illustrating a schematic configuration of the processor system 110 according to the second embodiment of the invention. Furthermore, in the case where common elements exist between the processor 110 and the processor 10, those elements will be referenced by the same reference numerals and signs, and detailed description thereof will be omitted since the operations thereof are the same.

The processor system 110 is the same as the processor system 10 except for the request arbitration apparatus 120.

Further, the request arbitration apparatus 120 is the same as the request arbitration apparatus 20 except that the request arbitration apparatus 120 has highest priority storage devices 91 to 94 instead of the priority change devices 41 to 44 and has an output control device 151 instead of the output control device 51.

The highest priority storage devices 91 to 94 are processors having storage regions which are not shown and respectively corresponding to the buffers 31 to 34. Each of the highest priority storage devices 91 to 94 performs a highest priority storage process for storing the highest priority among the priorities of all the requests held by the corresponding buffer whenever the corresponding buffer newly holds a request or each request of the corresponding buffer is output to the memory controller 60 by the output control device 151.

The output control device 151 sets the buffer corresponding to the highest priority storage device which is storing the highest priority as the highest priority buffer by comparing the priorities respectively stored by the highest priority storage devices 91 to 94. Then, the output control device 151 performs the request output process for outputting the request, which is held first by the buffer set as the highest priority buffer, to the memory controller 60. That is, only the method of setting the highest priority buffer is different, but the other operations are the same as those of the output control device 51. Furthermore, in the embodiment, when the number of the buffers, which are storing the highest priority, is plural, the highest priority buffer is set by the round-robin method, but may be set by a different method.

Next, operations of the processor system 110, which is configured as described above, according to the second embodiment of the invention will be described. In particular, an operation of the request arbitration apparatus 120 at the time of arbitrating the requests output from the processors 11 to 14 will be described.

Figure 7A:
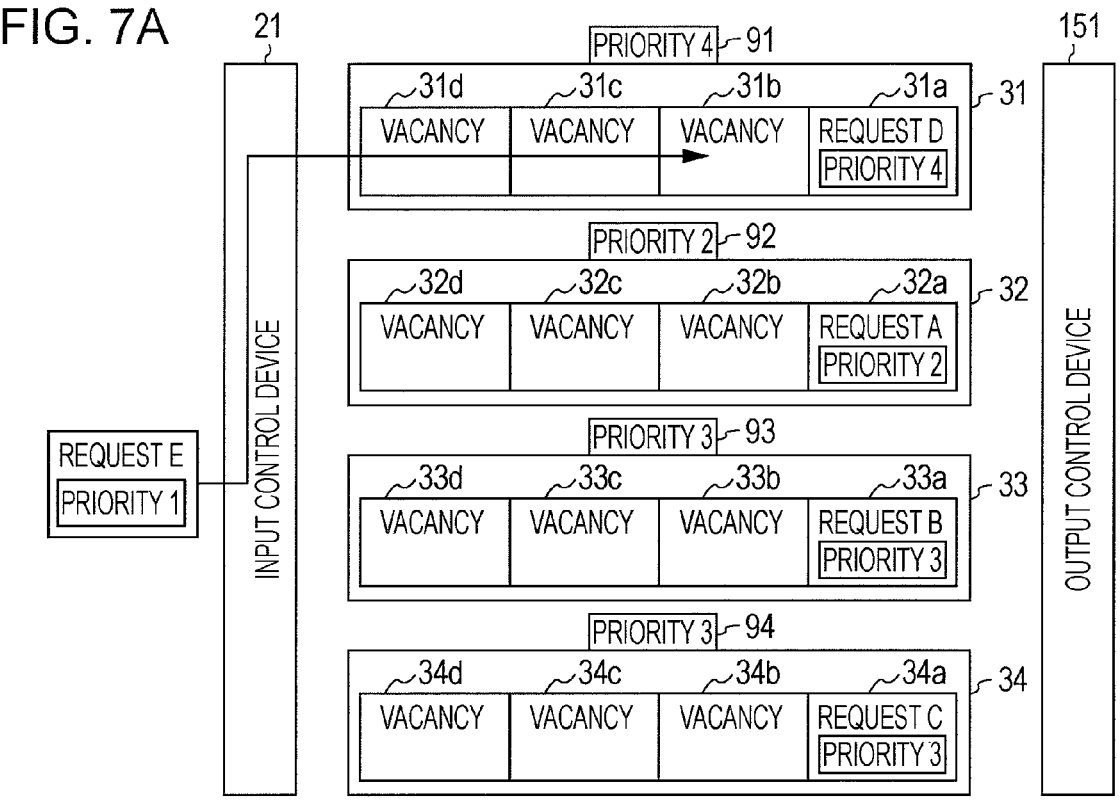
FIGS. 7A and 7B are explanatory diagrams illustrating conditions of operations of a request arbitration apparatus.

FIG. 7A shows, similarly to FIG. 5A, a state where the request A output from the processor 12 to the bank 72, the request B output from the processor 13 to the bank 73, the request C output from the processor 13 to the bank 74, the request D output from the processor 14 to the bank 71 are held by the buffers 31 to 34 of the request arbitration apparatus 120. At this time, each of the highest priority storage devices 91 to 94 performs the above-mentioned highest priority storage process. As a result, the highest priority storage devices 91, 92, 93, and 94 store the priorities "4", "2", "3", and "3". Furthermore, in this state, when the memory controller 60 is able to receive a new request, the output control device 151 performs the above-mentioned request output process. Specifically, the highest priority storage device 92 is storing the highest priority "2" among the priorities stored in the highest priority storage devices 91 to 94. Hence, the buffer 32 corresponding to the highest priority storage device 92 is set as the highest priority buffer, and the request A held in the retention region 32a of the buffer 32 is output to the memory controller 60.

Figure 7B:
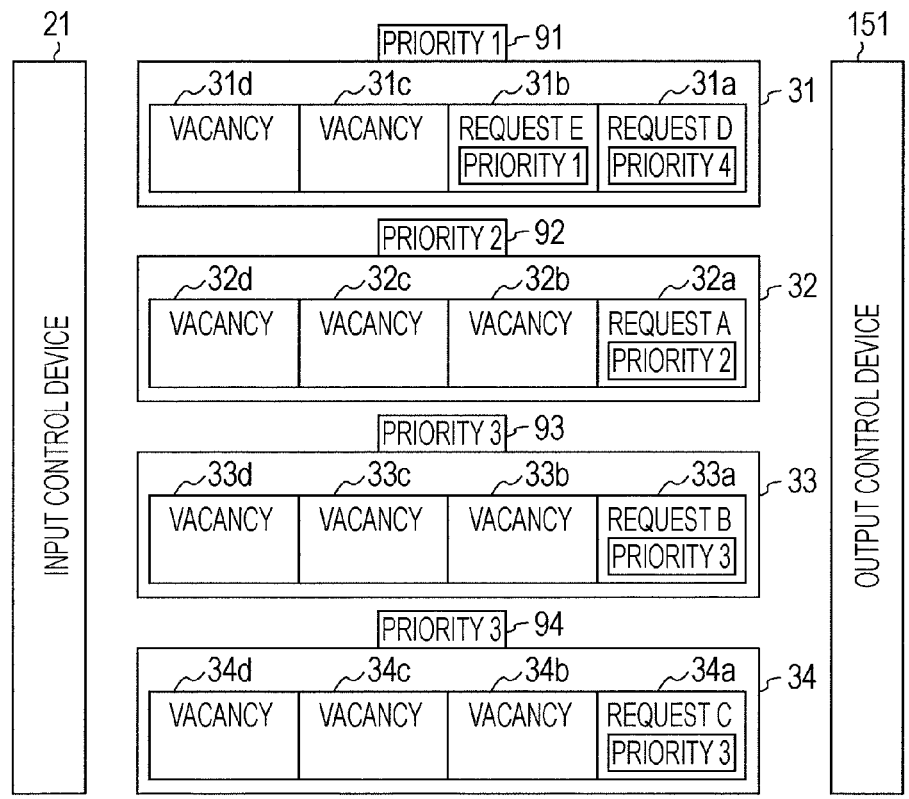
Figure 8:
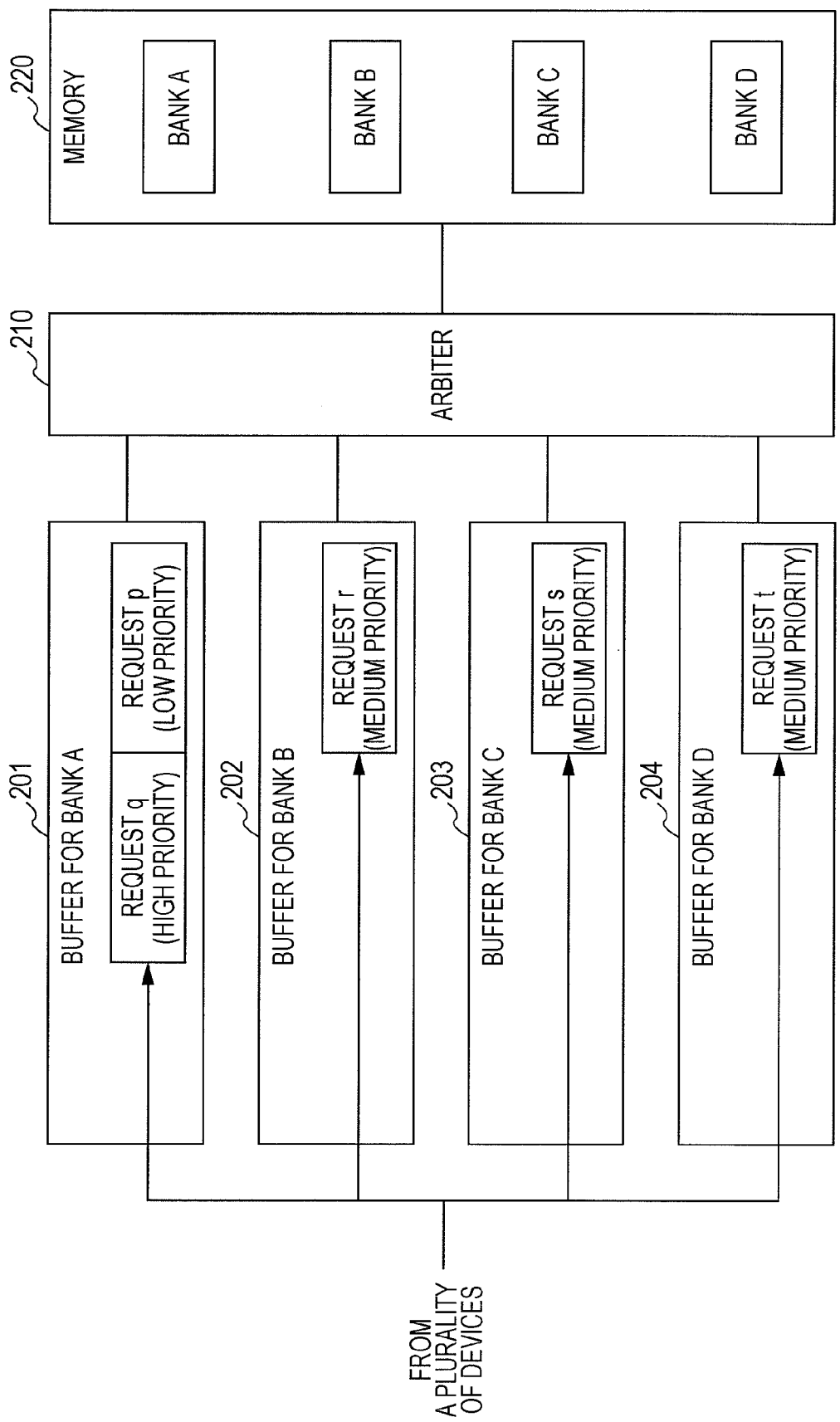
FIG. 8 is a configuration diagram of a buffer in a case of holding the request to a multi-bank memory.

In contrast, similarly to the case of FIG. 5B, when the memory controller 60 is unable to receive the new request and the input control device 21 newly inputs the request E, which is output from the processor 11, to the bank 71 as shown in FIG. 7B, the request E is held in the retention region 31b of the buffer 31. At this time, since the highest priority storage device 91 performs the highest priority storage process, the priority stored in the highest priority storage device 91 is changed from "4" to "1" as shown in FIG. 7B. Subsequently, when the memory controller 60 is able to receive the new request, the output control device 151 performs the above-mentioned request output process. Specifically, the buffer 31, which corresponds to the highest priority storage device 91 holding the highest priority "1" among the highest priority storage devices 91 to 94, is set as the highest priority buffer, and the request D, which is held in the retention region 31a of the buffer 31, is output to the memory controller 60. Thereby, since the buffer 31 is an FIFO system, the request E is held in the retention region 31a. Then, when the request D is output from the buffer 31, the highest priority storage device 91 performs the highest priority storage process, and stores the priority "1" of the request E since the buffer 31 is holding only the request E. In this state, the output control device 151 performs the above-mentioned request output process. Then, the output control device 151 sets the buffer 31, which corresponds to the highest priority storage device 91 being holding the highest priority "1" among the highest priority storage devices 91 to 94, as the highest priority buffer, and outputs the request E, which is held in the retention region 31a of the buffer 31, to the memory controller 60. In such a manner, the highest priority request E held later is output to the memory controller 60 earlier than the requests A to C.

Here, the corresponding relation between the elements of the second embodiment and the elements of the aspects of the invention is as follows. In the second embodiment, the buffers 31 to 34 correspond to the request holding sections of the aspects of the invention, the output control device 151 corresponds to the setting section and the control section, the highest priority storage devices 91 to 94 correspond to the highest priority holding sections, and the memory 70 corresponds to the output device. Furthermore, the second embodiment showed the operations of the processor system 110 as an example of the request arbitration method according to the aspect of the invention.

In the second embodiment mentioned above, even when the highest priority request is input later, the request is output from the buffer which has held the request. Accordingly, it is possible to output the highest priority request as fast as possible. Further, the highest priority storage devices 91 to 94 perform the highest priority storage processes, and the output control device 151 sets the buffer, which corresponds to the highest priority storage device holding the highest priority among the highest priority storage devices 91 to 94, as the highest priority buffer. Accordingly, it is possible to set the highest priority buffer in a shorter period of time compared with the case where the highest priority buffer is set by comparing the priorities of all the requests which are held by the buffers 31 to 34.

Furthermore, the invention is not limited to the embodiments mentioned above, and may be modified in various forms without departing from the technical spirit of the invention.

For example, in the above-mentioned embodiment, the buffers 31 to 34 respectively corresponds to the banks 71 to 74, but do not have to respectively correspond thereto if only the buffers correspond to the banks. For example, the number of buffers may be two. In this case, one buffer may correspond to the banks 71 and 72, and the other buffer may correspond to the banks 73 and 74. Further, the number of the banks may be two. In this case, one bank may correspond to the buffers 31 and 32, and the other bank may correspond to the buffers 33 and 34.

In the above-mentioned embodiment, the request arbitration apparatuses 20 and 120 include the buffers 31 to 34. However, the request arbitration apparatus includes the priority change devices 41 to 44 or the highest priority storage devices 91 to 94 and the output control device 50 or the output control device 50a. In addition, the buffers 31 to 34 and the input control device 21 may be configured, independent of the request arbitration apparatus. This configuration has the same advantage as that of the embodiment if only the request arbitration apparatus and the buffers 31 to 34 are connected to each other through signal lines and the like.

In the above-mentioned embodiment, each of the priority change devices 41 to 44 is formed as a processor for performing the priority change process, or each of the highest priority storage devices 91 to 94 is formed as a processor for performing the highest priority storage process. However, the device may be formed as a logic circuit configured to perform the same process. For example, elements such as comparators or flip-flops may be used.

In the above-mentioned embodiment, each request has a predetermined priority for each processor, but one processor may output a request having a plurality of priorities. For example, the processor 11 may output the request having a priority "1" or "2", and may determine which priority to output requests having the priority in accordance with contents of the process performed by the processor 11. Further, it may be necessary to urgently perform the process as it is necessary to store the current setting values due to an error occurring in any one of the processors 11 to 14. In this case, the processor in which the error occurs may output the request having a priority "0" which is the highest priority. In such a manner, it is possible to output the process, which is performed in an emergency by the processor having the error, to the memory 70 as soon as possible.

In the above-mentioned embodiment, each of the priority change devices 41 to 44 performs the priority change process, or each of the highest priority storage devices 91 to 94 performs the highest priority storage process, and on the basis of this result of the process, the output control device 50 or 50a performs the request output process. However, output control device 50 or 50a may also perform the priority change process or the highest priority storage process. Further, the buffer, which is holding the highest priority request, may be set as the highest priority buffer by comparing the priorities of all the requests, which are held by the buffers 31 to 34, when the memory controller 60 is able to receive a new request without performing the priority change process or the highest priority storage process.

In the above-mentioned embodiment, the request arbitration apparatuses 20 and 120 were described in which the processors 11 to 14 arbitrate the requests for the memory 70 having the plurality of banks 71 to 74. However, anything may be used if only it arbitrates the plurality of buffers when the requests held by the buffers are output. For example, the requests may be output by any device, such as a processor for controlling a scanner device or an interface for exchanging signals with the external devices, instead of the processors 11 to 14 that share a printing process and perform the shared processes. Further, the output targets of the requests may be any device, such as a plurality of processors or an interface, instead of the memory 70 having the plurality of banks 71 to 74. Furthermore, the request may be any request, such as a control signal for controlling the printing apparatus, instead of the request for reading or recording the data.

What is claimed is:

1. A request arbitration apparatus for arbitrating a plurality of request holding sections which hold requests having priorities when the requests are output from the plurality of request holding sections to the output device, the request arbitration apparatus comprising:
    a setting section coupled to the plurality of request holding sections that sets the request holding section, which holds the highest priority request among all the requests held by the plurality of request holding sections, as a highest priority request holding section;
    a control section coupled to the plurality of request holding sections that controls the highest priority request holding section so that the request firstly held among all the requests held by the highest priority request holding section is output to the output device; and
    a priority change section coupled to the plurality of request holding sections that, for each request holding section, whenever the request holding section holds a new request, makes the priorities of the requests, which are lower than that of the new request among the requests already held by the request holding section, be equivalent to that of the new request,
    wherein the setting section sets the request holding section, which holds the highest priority requests among the requests held first by the plurality of request holding sections, as the highest priority request holding section.

2. The request arbitration apparatus according to claim 1, wherein the output device is a memory having a plurality of banks, and
    wherein the request holding sections are sections corresponding to the respective banks of the memory and holding the requests as data input/output requests to the corresponding banks.

3. The request arbitration apparatus according to claim 1, further comprising:
    a determination section coupled to the plurality of request holding sections that, for each of the request holding sections, whenever the request holding section holds the new request, determines whether or not a priority of the new request is higher than the priorities of the requests already held by the request holding section.

4. A request arbitration method for arbitrating a plurality of request holding sections which hold requests having priorities when the requests are output from the plurality of request holding sections to the output device, the request arbitration method comprising:
    (a) setting the request holding section, which holds the highest priority request among all the requests held by the plurality of request holding sections, as a highest priority request holding section;
    (b) controlling the highest priority request holding section so that the request firstly held among all the requests held by the highest priority request holding section is output to the output device; and
    (c) for each request holding section, whenever the request holding section holds a new request, making the priorities of the requests, which are lower than that of a new request among the requests already held by the request holding section, be equivalent to that of the new request.

* * * * *